(12) United States Patent
Berghauser et al.

(10) Patent No.: US 6,186,207 B1
(45) Date of Patent: Feb. 13, 2001

(54) PRESS FOR TRANSFERRING VIDEO PRINTS TO CERAMIC MUGS AND OTHER SURFACES

(76) Inventors: Donald C. Berghauser; Sally H. Berghauser, both of 4664 S. Union Street, Morrison, CO (US) 80465

( * ) Notice: Under 35 U.S.C. 154(b), the term of this patent shall be extended for 0 days.

(21) Appl. No.: 08/124,442

(22) Filed: Sep. 22, 1993

Related U.S. Application Data (63) Continuation of application No. 07/892,490, filed on Jun. 3, 1992, now abandoned, which is a continuation of application No. 07/403,339, filed on Sep. 8, 1989, now abandoned, which is a continuation-in-part of application No. 07/240,507, filed on Sep. 6, 1988, now abandoned.

(51) Int. Cl.$^7$ ..................................................... B32B 35/00
(52) U.S. Cl. .......................................... 156/384; 156/583.1
(58) Field of Search ........................ 8/471, 472; 156/240, 156/581, 583.1, 583.3, 384; 269/87.1, 201

(56) References Cited

U.S. PATENT DOCUMENTS

| | | |
|---|---|---|
| 1,274,206 | 7/1918 | Shuman . |
| 2,019,537 | 11/1935 | Kiechkhefer . |
| 2,645,144 * | 7/1953 | Williams ............................... 269/201 |
| 2,647,337 | 8/1953 | Martin . |
| 2,684,775 | 7/1954 | von Hofe . |
| 2,699,698 * | 1/1955 | Adams ................................. 269/201 |
| 2,721,821 | 10/1955 | Hoover . |
| 2,920,009 | 1/1960 | Humphner . |
| 3,130,107 * | 4/1964 | Shank, Jr. .......................... 156/570 X |
| 3,209,688 | 10/1965 | Eldred et al. . |
| 3,255,476 | 6/1966 | Dawson . |
| 3,289,573 | 12/1966 | Apicella . |
| 3,363,557 | 1/1968 | Blake . |
| 3,484,342 | 12/1969 | Blake et al. . |
| 3,695,176 | 10/1972 | Van Der Roer . |
| 3,707,346 | 12/1972 | Markert et al. . |
| 3,813,268 * | 5/1974 | Kerwin ................................. 156/542 |
| 3,816,221 * | 6/1974 | Shank, Jr. ......................... 156/572 X |
| 3,860,388 | 1/1975 | Haigh . |
| 3,888,623 | 6/1975 | Clarke et al. . |
| 3,969,071 | 7/1976 | Hugelin . |
| 3,977,318 | 8/1976 | Cohan . |
| 4,021,591 | 5/1977 | Devries et al. . |

(List continued on next page.)

FOREIGN PATENT DOCUMENTS 57-102390  *  6/1982  (JP) .

OTHER PUBLICATIONS

Fletcher, "Drilling Jig", IBM Tech. Disclosure Bulletin, vol. 14, No. 7, Dec., 1971–p. 2050.*
User's Manual Kodak SV6500 Color Video Printer.
Hitachi Video Floppy System VX–52A, Hitachi Color Video Printers VY–50A/VY100A.
Kodak SV6500 Color Video Printer User's Manual, 1987.
K. Venkataraman's *The Chemistry of Synthetic Dyes*, vol. VIII, Chapter V, pp. 191–194, 200–202, 212–214 and 220; by C. E. Vellins, Academic Press, 1978.

* cited by examiner

Primary Examiner—Curtis Mayes
(74) Attorney, Agent, or Firm—Penrose L. Albright

(57) ABSTRACT

A device and method that employs prints produced by video color system thermal printers as transfers for creating personalized ceramic mugs, tiles or the like articles. The method comprises creating a mirror image print by means of a color video system with printer, applying that print to the surface of the mug or the like which has been treated with a sublimable dye absorbing compound, and applying heat (200 to 400° F.) and pressure exerted by a force of 200 to 400 pounds for period of time of about three to six minutes, to sublimate the limited dye in the print whereby it is absorbed by the coated surface of the mug or the like. The device for applying the heat and pressure is a heated press that has removable heated slidable platens which conform to the shape of the article to which the print is being transferred.

32 Claims, 7 Drawing Sheets

U.S. PATENT DOCUMENTS

| | | |
|---|---|---|
| 4,058,644 | 11/1977 | Devries et al. . |
| 4,171,202 | 10/1979 | Sideman et al. . |
| 4,171,230 | 10/1979 | Bolliger et al. . |
| 4,201,821 | 5/1980 | Fromson et al. . |
| 4,202,290 | 5/1980 | Hatfield . |
| 4,205,991 | 6/1980 | Becker et al. . |
| 4,250,831 | 2/1981 | McMillin et al. . |
| 4,278,434 | 7/1981 | Krock et al. . |
| 4,323,601 | 4/1982 | McMillin et al. . |
| 4,455,934 | 6/1984 | van der Roer . |
| 4,465,489 * | 8/1984 | Jenkins et al. ............... 8/471 |
| 4,465,728 | 8/1984 | Haigh, deceased et al. . |
| 4,541,340 | 9/1985 | Peart et al. . |
| 4,591,360 | 5/1986 | Jenkins et al. . |
| 4,628,811 | 12/1986 | Lozen . |
| 4,650,494 | 3/1987 | Kutsukake et al. . |
| 4,666,320 | 5/1987 | Kobayashi et al. ............... 400/241.1 |
| 4,758,952 | 7/1988 | Harris, Jr. et al. . |
| 4,804,433 * | 2/1989 | Smith ............................ 156/359 |
| 4,874,454 * | 10/1989 | Talalay et al. .................. 156/481 X |
| 4,923,848 | 5/1990 | Akada et al. . |
| 4,943,684 * | 7/1990 | Kramer ......................... 427/287 X |

PRESS FOR TRANSFERRING VIDEO PRINTS TO CERAMIC MUGS AND OTHER SURFACES

RELATED APPLICATIONS

This is a Continuation of application Ser. No. 07/892,490, filed Jun. 3, 1992, now abandoned, which is a Continuation of application Ser. No. 07/403,339, filed Sep. 6, 1989, now abandoned, which is a Continuation-In-Part of application Ser. No. 07/240,507, filed Sep. 6, 1988, now abandoned.

BACKGROUND OF INVENTION

1. Field of Invention

The present invention relates in general to print transfers using sublimation dyes, and in particular to a pressing apparatus and method of making sublimation dye transfers from color video system prints and effectively applying such prints to coated ceramic mugs, tiles or coated metal articles, or like articles.

2. State of the Art

Methods and various types of Apparatus for producing photographic-like images on hard surfaces such as ceramic mugs and tiles are commercially available to fulfill an existing need evident from the large number of decorated mugs and tiles sold and on sale in a wide variety of consumer retail outlets. These products are currently manufactured by utilizing pre-print transfers, such as decals, in most, if not all, cases which are produced by employing one of the following methods: silk screen printing, offset printing, gravure printing or mimeograph, the inks being used in these processes containing sublimable dyes. These methods require color separation and, in view of economic considerations, relatively long production runs. Another known process uses transfers produced on a xerographic type copy machine, but these transfers are limited to monotones, that is, a single color or black on white. These known transfer systems are not used, as a practical matter, for producing single, one-of-a-kind full color transfers or at least are not economically so used, and currently, other than the instant invention, the only commercially viable method for producing such one-of-a-kind colored ceramic mugs is by hand painting individual pieces.

Today's color video print systems employ primary thermal printing of sublimable dyes that have previously been applied on webs by known techniques. These webs contain successive blocks of yellow, magenta and cyan dyes which are thermally transferred onto print papers specially treated to accept and absorb the sublimable dyes. Information on such printing techniques is disclosed in U.S. Pat. No. 4,650,494, issued Mar. 17, 1987, to Kutsukake et al and U.S. Pat. No. 4,731,091, issued Mar. 15, 1988, to Majima. For the sublimable dyes to be absorbed and provide an image on the reception medium, which is resistent both to wear and fading or color distortion on exposure to daylight or artificial lighting, that medium is provided with a coating of, or is a composition of, or has mixed within its body materials of the types disclosed by Davis, U.S. Pat. No. 4,395,263 of Jul. 26, 1983; Hi et al, U.S. Pat. No. 4,354,851 of Oct. 19, 1982, and Krajec, U.S. Pat. No. 4,664,672 of May 12, 1987.

The art is redundant with patents disclosing methods and apparatus for primary transfer printing wherein sublimation dyes are affixed by known printing techniques, such as off-set, gavure and silkscreen, to carrier webs or sheets, which, in turn, are applied at various temperatures and onto surfaces of varying compositions. For the most part, this primary printing, using carriers or transfers with the prints thereon, is accomplished by heating the elements of the process to the sublimation temperatures of the dyes at near normal atmospheric pressures. The printed side of the carrier or transfer is placed in contact with the object onto which the image is to be printed while heat is applied to either the transfer, or the material to be printed, or both for relatively short durations, normally from one to ten seconds. With exceptions such as disclosed in U.S. Pat. No. 4,395,263 of Davis which relates to printing on various laminates, U.S. Pat. No. 4,411,667 of Meredith et al of Oct. 25, 1983, and U.S. Pat. No. 4,462,852 of Custor, issued Jul. 31, 1984, addressed to printing on materials passing between rollers, the application of significant pressure has not been considered a crucial factor in the transfer process. However, these latter patents are for primary print transfers. As described in the Meredith et al and Custor patents, pressure is provided to compensate for the extremely short contact period between the carrier web and the surface to receive the image. Davis teaches that a small amount of pressure may be used to control the transfer.

SUMMARY OF THE INVENTION

An important object of the present invention is to provide a method to transfer a full color one-of-a-kind image to a hard surface and do it economically and rapidly. It is also an object of this invention to provide a device for applying these one-of-a-kind images to ceramic mugs.

It has been discovered that the foregoing objects can be effectively accomplished by using a color video thermal printing device which produces the image to be transferred to a selected object such as a mug or tile. It has thus been discovered that prints produced using these printers, that is, products of known video printers' primary print processes, can be effectively transferred to surfaces which have a coating adapted to absorb the sublimable dyes therein. When the proper heat and pressure are applied, using the thermal transfer press of the instant invention, the image on the print is transferred to the mug surface as a crisp and faithful copy. This secondary print process, making such use of a print from a primary print process product, previously unknown, provides a relatively rapid and economical vehicle for producing one-of-a-kind mugs or other articles.

The invention is illustrated in preferred embodiments in the accompanying figures, in which.

BRIEF DESCRIPTION OF THE DRAWINGS

DETAILED DESCRIPTION OF THE INVENTION

Figure 1:
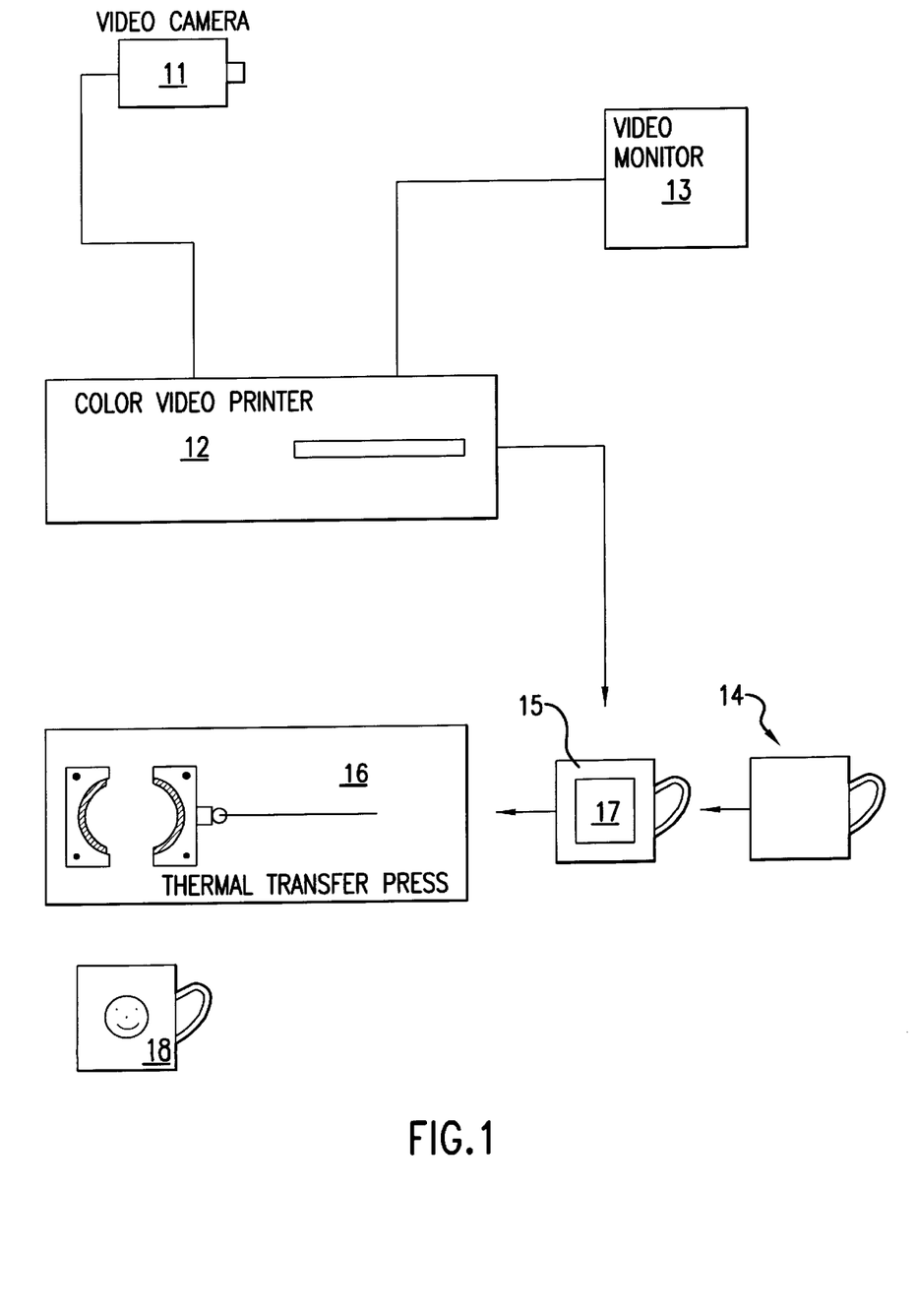
FIG. 1 is a schematic illustrating a method for producing image on surfaces using the color sublimation transfer process in accordance with the present invention.
Figure 2:
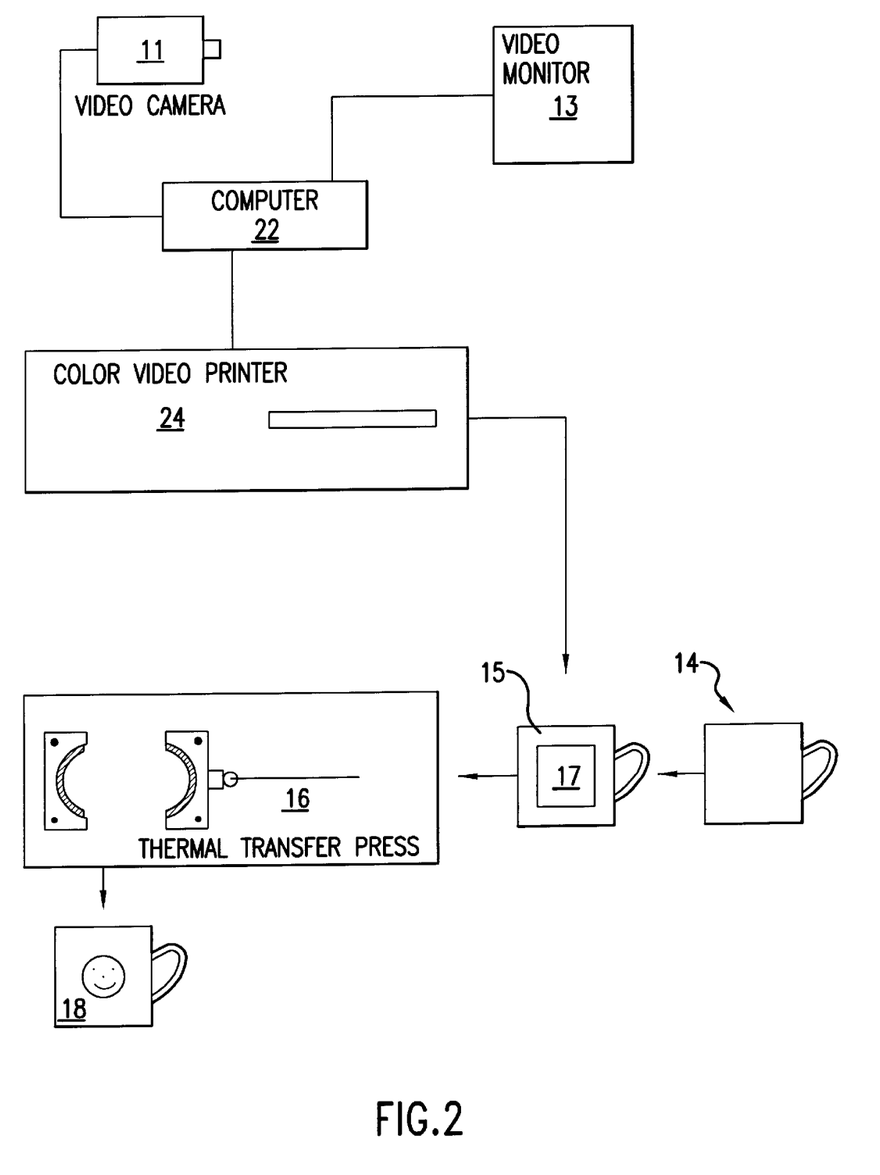
FIG. 2 is a further schematic of a further method of a color sublimation transfer process which utilizes a mechanism or program that produces mirror images which is also in accordance with the present invention.

The invention involves a novel use of normal prints produced by a color video printing system which employs a sublimable dye thermal transfer printer 12, such as the Kodak SV 6500 color video printer using the Kodak SV 100 color video print materials. Color video printers were developed to produce high resolution prints in full color of anything that can be viewed on a television screen, freezing the motion, and recording the resulting image. The color video system thus functions to record images for future reference and for producing prints thereof. This invention is directed to a novel use of such prints customarily produced by these color video printing systems. The images to be used in the inventive process are preferably converted by a logic means, such as provided in the Hitachi Color Video Printer VY-55A or by a computer 22 as seen in FIG. 2 with appropriate graphics capability, to produce a print 17 which is a mirror image of that which would be otherwise transmitted by the video camera 11. Video printer 12 uses a known primary, sublimable dye heat transfer printing apparatus and method to create a print, direct (by the process illustrated in FIG. 1) or preferably mirror image (by the process illustrated in FIG. 2), of a composition received by camera 11 as viewed on monitor 13. The image produced on print 17 is then transferred to specially coated ceramic mug 14 to create a one-of-a-kind product. When print 17, produced by color video printer 12, is placed in thermal transfer press 16 for a ceramic mug, where temperatures of 320°–480° F., preferably about 400° F, are applied under high pressure for three to six minutes, the dyes in the print are absorbed into coating 18 of mug 14 from print 17. Because the quantities of sublimable dyes in print 17, which are available therefrom for transfer, are limited, it is critical to provide an essentially perfect continuous, heated and substantially high pressure contact between print 17 and the surface to receive the image therefrom.

Figure 3:
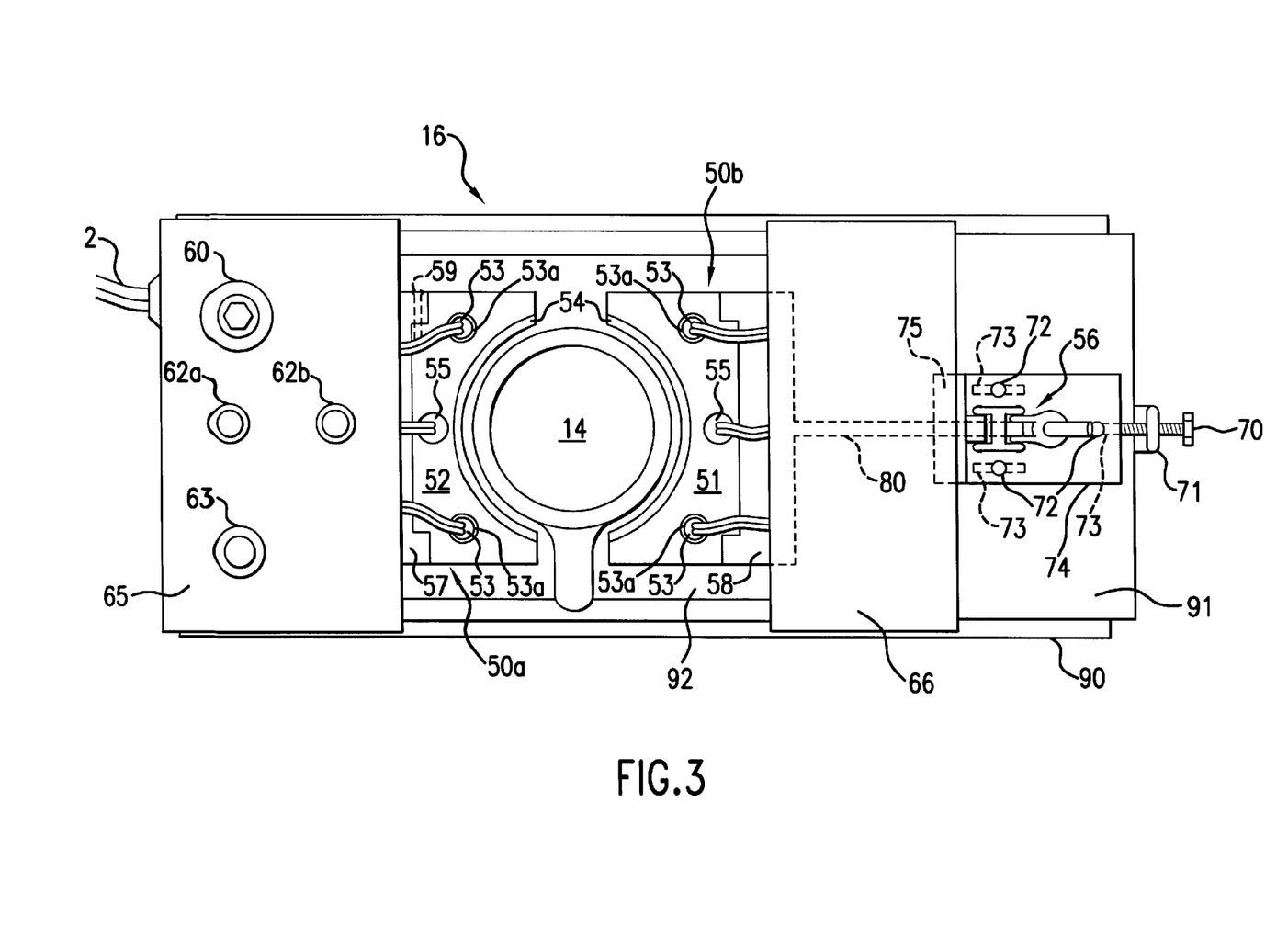
FIG. 3 is a plan view of the thermal transfer press in accordance with the invention.
Figure 4:
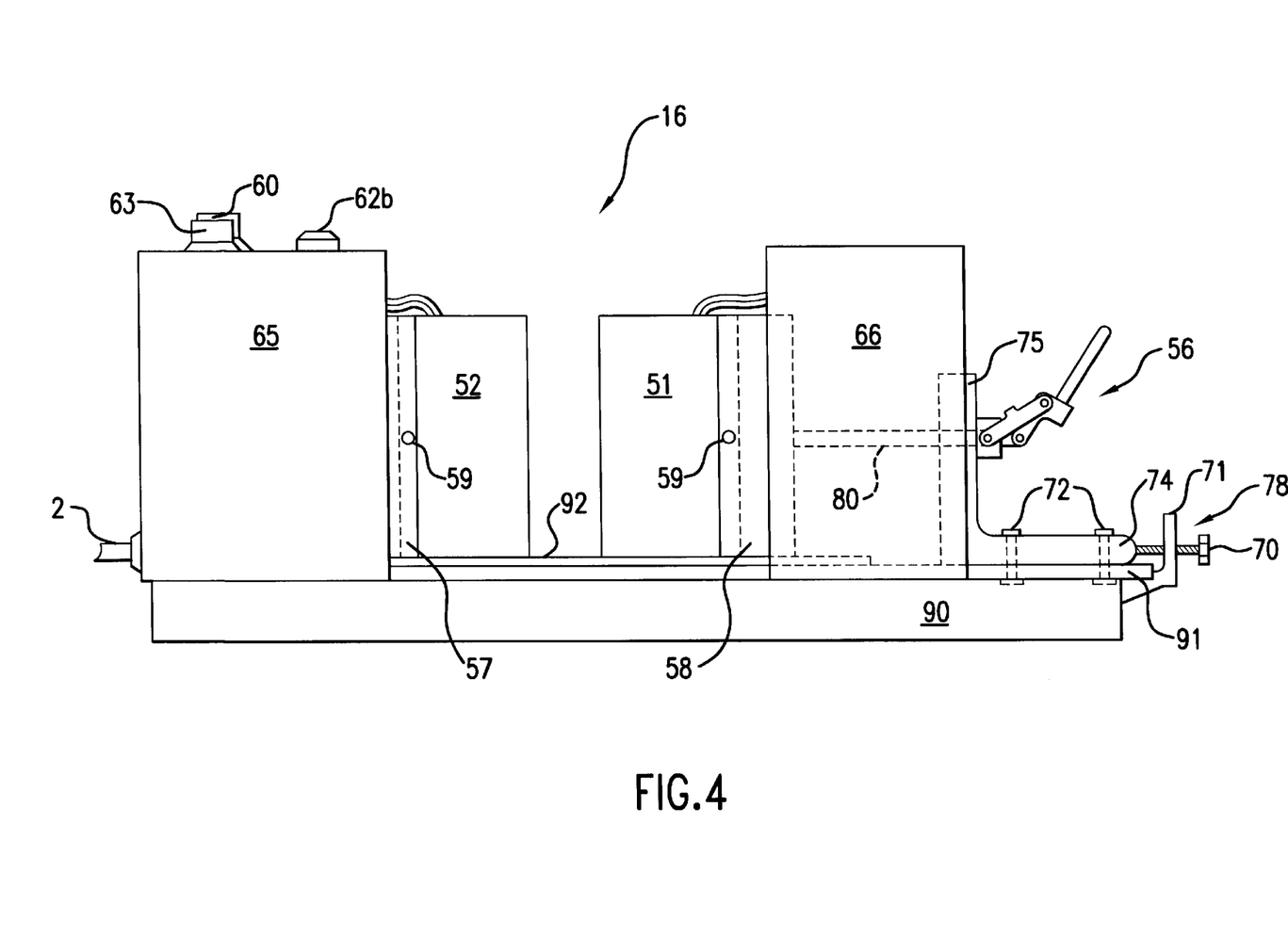
FIG. 4 is a side elevation of the thermal transfer press shown in FIG. 3.
Figure 7:
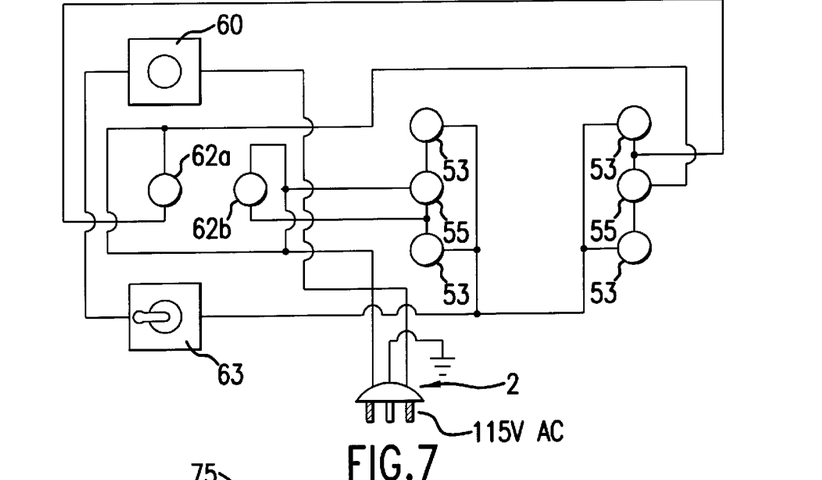
FIG. 7 is a wiring diagram in accordance with the invention.

Referring in particular to FIGS. 3 and 4, thermal transfer press 16 is mounted on hollow base 90. Fixed on the upper surface of base 90 is guide platform 91. This guide platform 91 is slightly narrower than the width of base 90 and, at the end where pressure handle assembly 56 is mounted, platform 91 extends a short distance beyond the end of base 90. To the left of guide platform 91 as seen in FIGS. 3 and 4, base 90 provides a seat for attaching the bottom of cover assembly 65. A further cover assembly 66 is mounted to straddle guide platform 91 and is secured on its right as seen in the figures to a right angle adjustment piece 75 which is received in part in a corresponding depression formed in cover assembly 66. A slide plate 92, made of a heat resistant material, is affixed to the top of platform 91 between assemblies 65 and 66, extending partially under the latter assembly. Cover assembly 65 houses the electrical circuitry, (shown in FIG. 7), to power and control the device. Power cord 2 feeds 115 volt alternating current into housing cover assembly 65. Mounted on top of housing cover assembly 65 are a circuit breaker 60, an on/off switch 63 and temperature indicator lights 62a and 62b. Cover assembly 65 is open on its center facing side.

Mounted on slide plate 92, so as to be partially covered by cover assembly 65, is platen assembly 50a which comprises base block 57 and metal platen 52. Base block 57 is fixedly secured to slide plate 92. Metal platen 52 is removably affixed to transverse, vertically extending base block 57 by recessed bolts or screws 59, only one being shown in FIG. 3, which pass through wing extensions to stationary block 57 into an offset extended portion of metal platen 52. Immediately opposite metal platen 52, and spaced apart therefrom, is a corresponding metal platen 51. Metal platen 51 may be removably attached by means of recessed bolts or screws 59 to a sliding block 58 to form a sliding platen assembly 50b. Sliding block 58 is partially housed inside cover assembly 66.

Metal platens 51 and 52 are configured for use with mugs of the same dimensions. Differently configured sets of metal platens are provided for different sizes of mugs, beer steins or the like.

Metal platens 51 and 52 are each heated by two conventional electric resistance heaters 53, each having a rating of 300 watts, removably seated in receptacles 53a. Each metal platen, 51 and 52, also has a thermostat 55 removably seated in a complimentary receptacle. The inner surfaces of metal platens 51 and 52 are concave and subscribe an equal radii arc of approximately 160°. Mounted to their inner surface is a silicone rubber gasket 54. The concave surface of metal platens 51 and 52 and the silicone rubber gaskets 54 combine to ensure total contact of the concave surface of metal platens 51 and 52 with print 17, mounted on the outer surface of mug 14, when the device is in operation.

Figure 5:
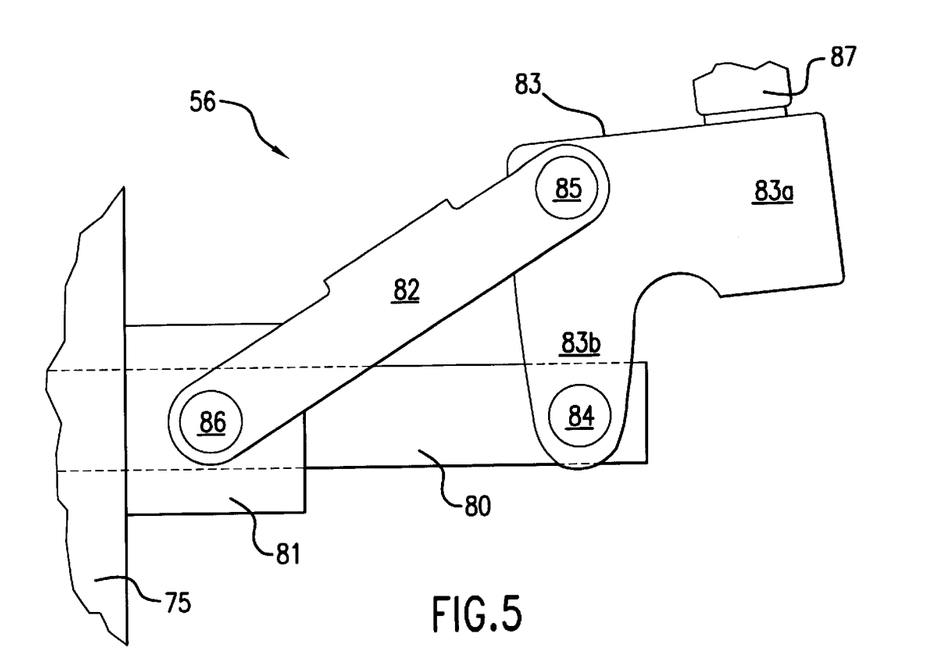
FIG. 5 is a side detail view showing the pressure handle employed in the press.

Rigidly attached to sliding block 58, approximately in the center thereof and extending perpendicular to the rear surface of sliding block 58 is rod 80. Rod 80 passes through an aperture in upwardly extending part 75 of right angle adjustment piece 74. As seen in FIG. 5, attached to an upwardly extending part 75, and providing an extension to the aperture through which rod 80 passes, is support block 81. Movably connected to support block 81 and the outwardly extending end of rod 80 is pressure handle assembly 56 which attaches to support block 81 by means of a parallel pair of links 82. As can be viewed in FIGS. 3 and 5, these links 82 extend from each side of support block 81 to an outer side of bell crank part 83. Extending rigidly between links 82 is a cross piece which is integral with or welded to links 82. The lower ends of links 82 are pivotally mounted to support block 81 by means of studs 86. The opposite upper ends of the links 82 are pivotally attached by a horizontal pin 85 to bell crank part 83. Lower arm extension 83b of part 83 is split to be received on each side of rod 80 to which it is pivotally mounted by pivot pin 84. Handle 87 is threadably received in the upper head portion 83a of bell crank part 83. Although pressure assembly 56 has been described as a mechanical device, it will be appreciated by those skilled in the art that a hydraulic or pneumatic pressure assembly as would occur to one skilled in the art could be substituted as an equivalent thereof.

Pressure adjustment is provided by adjustment member 78. A bracket 71 is fixedly attached to base 90 and guide plate 91. A threaded aperture through an upward extension of bracket 71 receives a threaded pressure adjustment screw 70. The threaded end of adjustment screw 70 bears against right angle adjustment piece 74. Mounted on the upper surface of the horizontal portion of right angle adjustment piece 74 are three locking bolts 72 which are received in associated slots 73 in guide plate 91 and base 90 in a known arrangement so that upon being tightened they firmly secure right angle adjustment piece 74 in position relative to guide plate 91.

Figure 6:
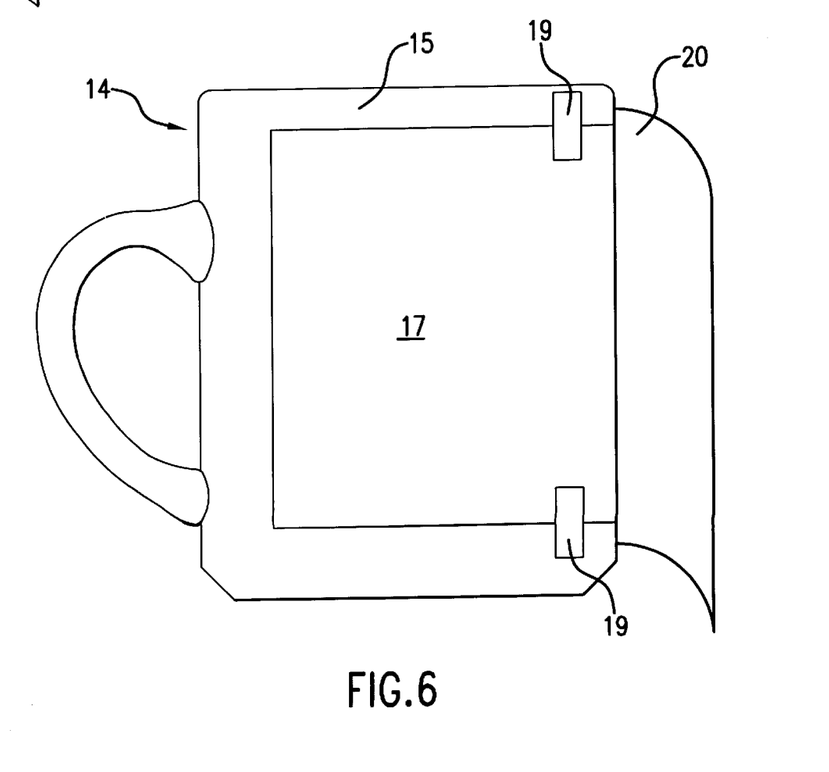
FIG. 6 is a view of a mug having a video print attached; and showing also a teflon coated wrap.

To use mug heat press 16, a camera 11 is focused on the desired subject matter (which might be a photograph) and conveys the image it receives onto monitor 13. Either through incorporation of a graphics computer 22 or by means internal to a color video printer 12, a mirror image of the recorded image as selected on, and as may be adjusted by, monitor 13 is recorded and printed by video printer 12. The resulting print 17 is then placed with the print side against a ceramic mug 14 (see FIG. 6) which has been previously permanently coated with a material known to be receptive to absorption of sublimable dyes. Print 17 is held against surface 15 of mug 14 by means of tape 19. Tape 19 is of a type, such as duct tape, which will be unaffected by the temperatures to which it will be subjected and does not affect the finish of surface 15. Mug 14 and print 17 are then wrapped with a thin layer of teflon coated material 20 and placed in the gap between metal platens 51 and 52. Mug 14 is placed so that the open portion is down and the lip rests on slide plate 92. The handle protrudes from the gap between platens 51 and 52. Pressure assembly 56 is closed by pulling down handle 87 to force platen 51 toward metal platen 52 thereby clamping mug 14 between the two platens. Metal platen 51 is then adjusted incrementally by means of adjustment screw 70 to apply increased pressure on mug 14. In so doing, silicone rubber gaskets 54 are compressed. When maximum or, in any event, substantial compression of silicone rubber gaskets 54 is obtained, pressure adjustment screws 72 are tightened thereby locking right angle adjustment piece 74 in place. Handle 87 is lifted withdrawing platen 51 and allowing cup 14 to be removed. Electric heating elements 53 are turned on by means of on/off switch 63. When they reach the temperature for which thermostats 55 are set, thermostats 55 open and the corresponding indicator lights 62a and 62b are energized signalling that metal platens 52 and 51 have reached transfer temperature. Cup 14 is then placed between platens 51 and 52 and pressure assembly 56 closed by means of handle 87.

The cup is held under the applied force squeezed between platens 51 and 52 of about 200 to 400 pounds for a period of three to six minutes at a platen temperature of 400° F. plus or minus eighty degrees. In the instant embodiments, a high pressure is essential and the force applied is near to, but of course, less than that which would break the mug. At the end of the period, pressure assembly 56 is opened by lifting handle 87, mug 14 taken from the press, teflon cover 20 removed, and print 17 is pulled from mug 14. Mug surface 15 has embedded therein a clear, crisp image with good color qualities, that replicates the composition imaged by color video camera 11 on monitor 13.

Figure 8:
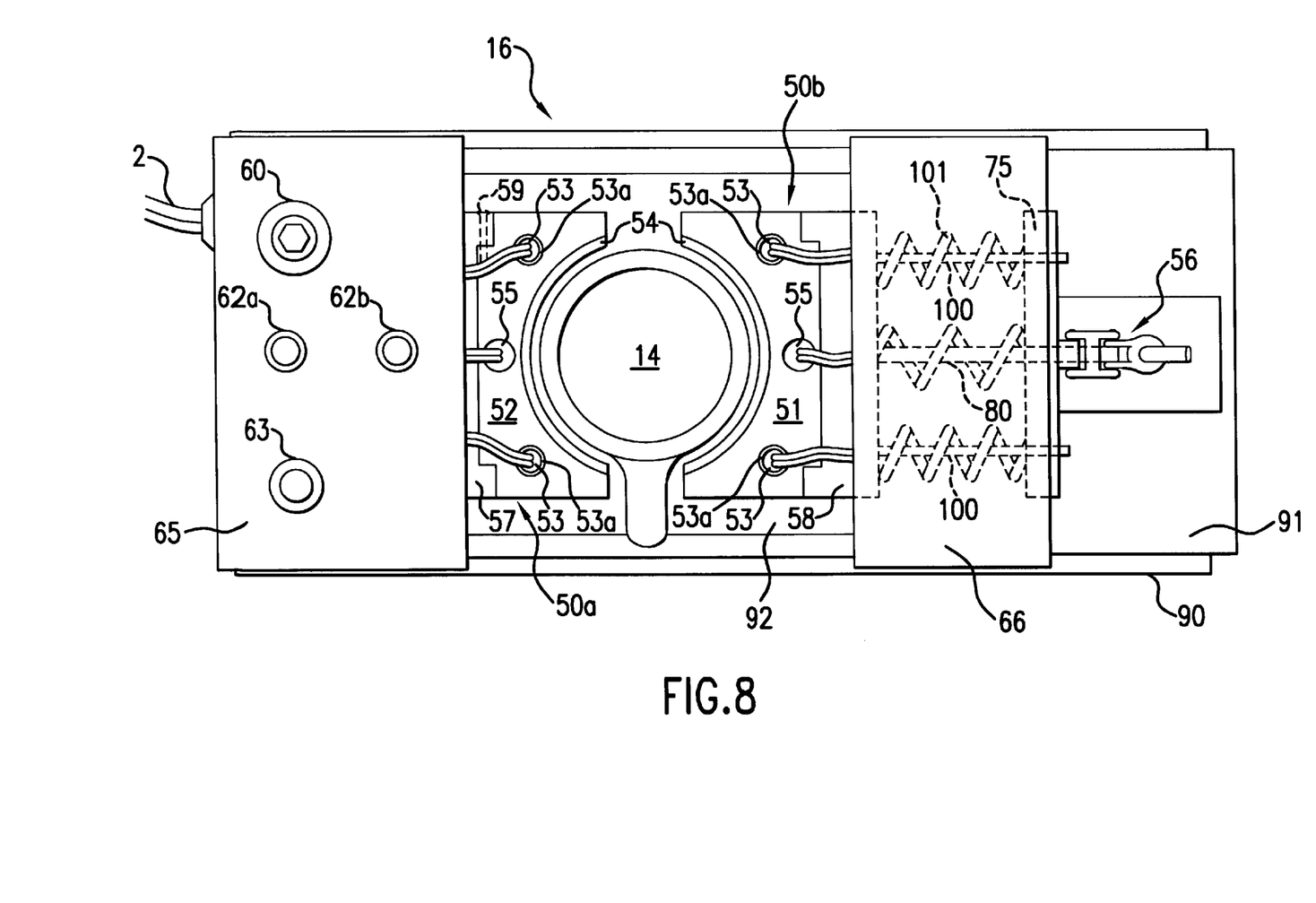
FIG. 8 is a plan view that shows a second embodiment of a heat transfer press.
Figure 9:
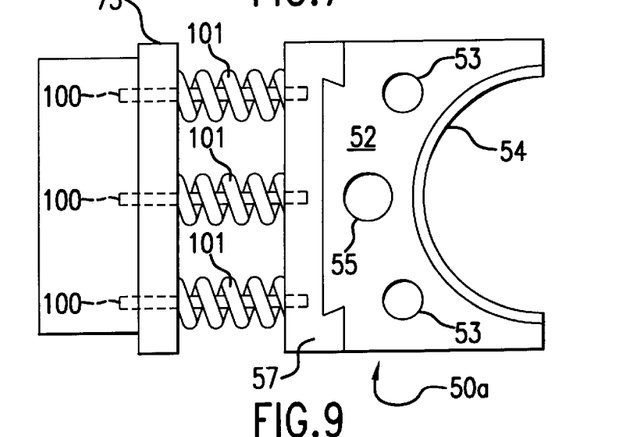
FIG. 9 is a plan view of a relatively stationary press block or metal platen that incorporates compression springs which can be substituted for the corresponding press block in the embodiment of FIG. 3 or FIG. 8.

A second embodiment of mug press is shown in FIG. 8. In this embodiment, pressure adjustment is provided by rod and spring assemblies. Shown only for adjustable platen assembly 50b in FIG. 8, the same arrangement can be employed with platen assembly 50a as shown in FIG. 9. These platen assemblies 50a or 50b or both are slidably affixed to a base plate such as shown by upward extending part 75. For platen assembly 50a, three compression assemblies, each comprising a rod 100 and compression spring 101 are placed between a fixed receiving plate 76 and sliding block 57. Platen assembly 50b, on the other hand, is attached to upward extending part 75 by means of rods 80 attached to pressure handle assembly 56 and the back of sliding block 58 and by rods 100 attached threadably or by welding or other suitable means to the back of sliding block 58 and passing through openings in upward extending part 75. Surrounding rods 100 and 80 between sliding block 58 and upward extending part 75 are compression springs 101. Thus, pressure handle assembly 56 allows pressure to be relieved and the cup removed as well as providing the principal component of pressure to the cup during the transfer process. The rod and spring assemblies provide the pressure to the back of sliding platen 57 and 58 wherein a tight, continuous seal is obtained over the entire surface of the print against the cup. Block 57 of assembly 50a has a central rod 100 rather than rod 80 attached thereto. The rods 80 and 100 are slidably received through bores in part 75. Fully compressed, each spring 101 exerts about 75 pounds of force.

Transfer prints made from this system can also be printed onto a flat surface such as specially treated ceramic tiles and metal as well as fabrics containing at least 50% polyester. In all cases it is important to have the temperature in preferably a 325°–450° F. range and to apply the necessary high pressure. Most flat heat presses which can produce the desired high pressure and high temperature should operate successfully in applying the transfer to flat surfaces.

Figure 10:
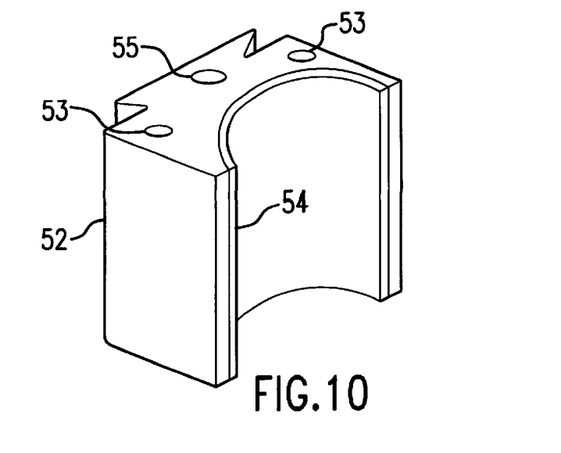
FIG. 10 is a perspective view of one of the removable and replaceable press blocks.

Platens 51 and 52 can be readily removed, one such platen 52 being shown by itself in FIG. 10. Their electrical connections to electric heaters 53 and thermostat 55 are easily connected and disconnected. A variety of different sizes and shapes of platens 51 and 52 may be used interchangeably. For example, the diameters may be different for different sizes of mugs. They may be provided with flat faces for tiles and the like.

The foregoing description of the preferred embodiments of this invention has been presented for the purpose of illustration and description. It is not intended to be exhaustive or to limit the invention to the precise forms and mechanisms disclosed. The scope of the invention should not, therefore, be considered as limited to the embodiments this detailed description, but rather by claims appended hereto.

Having described our invention, what we claim as new and to be secured by Letters Patent of the United States is:

1. An apparatus for transferring a multiple color image using sublimable dyes which comprises:

color sublimation thermal printing means for printing an image of said sublimable dyes in at least three colors by sublimating them onto a medium; and means for transferring said sublimable dyes from said medium to an object on which a multiple color image is to appear said means for transferring comprising thermal pressing means which operates at a temperature of about 350° F. to 450° F. which causes said sublimable dyes to sublimate and causes a sufficient quantity of said sublimable dyes to bond to said object and to form said multiple color image thereon.

2. An apparatus for printing a multiple color image using sublimable dyes comprising:

means for creating a multiple color image which includes: color sublimation thermal heat printing means for printing said sublimable dyes in at least three colors in said multiple color image by sublimating them onto a medium; and transferring means for transferring said sublimable dyes from said medium to an object on which the image is to appear, said transferring means comprising thermal pressing means operated at a temperature which is in a range of about 350° F. to 450° F. which will cause said sublimable dyes to sublimate, said transferring means further causing said sublimable dyes to bond on said object in the multiple color image.

3. An apparatus for printing a multiple color image on an object comprising:

color sublimation thermal printing means for printing multiple color sublimable dyes onto a sheet so that said multiple color image is formed on said sheet by the sublimation of said sublimable dyes; and means for transferring said sublimable dyes from said sheet to an object on which said image is to appear, said transferring means including thermal pressure means heated to a temperature which is in the range of about 350° F. to 450° F. that causes said sublimable dyes to sublimate and to cause sufficient of said sublimable dyes to bond to said object to form said multiple color image.

4. An apparatus for placing multiple color images on surfaces composed of a material that accepts sublimable dyes comprising the monitor of a color video print system, a color video sublimation thermal printer connected to receive multiple color images seen in said monitor and to transfer by sublimating multiple color sublimable dyes on an image seen in said monitor onto a medium, press means for applying force to the back of said medium which is greater than that required to obtain complete pressurized contact between said medium and said surface, and heating means for heating said medium to about 350° F. to 450° F. while said force means is being applied to said medium against said surface so that the sublimable dyes thereon are sublimated and said image is transferred to said surface from the front of said medium.

5. An apparatus for transferring a multiple color image using sublimable dyes which comprises:

camera means for creating a video image;

monitor means for viewing the video image created by said camera means;

a computer interconnected to said camera means and to said monitor means for receiving and digitizing said multiple color image seen on said monitor and for manipulating said multiple color image;

a color video dye sublimation printer means for receiving said multiple color image as manipulated by said computer transferring said multiple color image by means of sublimating sublimable dyes of said image onto a medium wherein said multiple color image is formed by said sublimable dyes; and transferring means for transferring said sublimation dyes from said medium to an object on which a multiple color image is to appear, said transferring means comprising thermal means which operates at a temperature in the range of about 350° F. to 450° F. which will cause said sublimable dues to sublimate and cause a sufficient quantity of said sublimable dyes to bond on said object and form said multiple color image thereon.

6. An apparatus in accordance with claim 5, wherein said object is curved where the image is transferred thereto and said transferring means is conformed to the curvature of said object where said image is received thereon.

7. An apparatus in accordance with claim 5, wherein said transferring means comprises a heated pliant material which is compressed when bearing against said object while said sublimable dyes are being transferred to said object.

8. An Apparatus for use in a process of producing prints in a color video printer by sublimating multiple dyes to make images on said prints and transferring said images from said prints by sublimating said dyes of which said images on prints are composed by means of the apparatus to be transmitted to the surface of a drinking vessel having a surface receptive to sublimation dyes, the apparatus comprising:

A. a base assembly;

B. a first platen assembly mounted on an upper surface of said base assembly near an end of said base assembly;

C. a second platen assembly slidably mounted on the upper surface of said base assembly, said second platen assembly disposed opposite said first platen assembly in an arrangement so that the drinking vessel is received therebetween;

D. means for sliding said platen assemblies rectilinearly relative to each other so as to retain the drinking vessel with a print applied thereto under a pressure exerted by about two hundred to four hundred pounds of force on said drinking vessel between said first and said second platen assemblies; and E. means for heating said first and said second platen assemblies to a temperature in the range of about 320° F. to 480° F., said means for heating sufficiently heating said platen assemblies while said means for sliding retain said drinking vessel and said print under sufficient high pressure for a sufficient period of time while said print is being forced against said drinking vessel to effect a substantially faithful sublimation transfer of an image from said print to said drinking vessel; said means for sliding said second platen assembly comprising:

a. a pressure application means for clamping the drinking vessel between said first and said second platen assemblies under pressure; and b. micro-adjustment means for achieving a desired high pressure applied by said pressure application means against said print without breaking the mug; said micro-adjustment means further comprising:

(a) a right angle adjustment piece, said right angle adjustment piece having a horizontal arm slidably seated on said guide plate;

(b) at least two vertical shafts passing through said horizontal arms, said two vertical shafts aligned with horizontal slots on said base assembly;

(c) at least two pressure adjustment means, one said pressure adjustment means received in an alignment of one of said vertical shafts and one of said horizontal slots, said pressure adjustment means providing means for locking said right angle adjustment piece relative to said base assemblies; and (d) horizontal adjustment means for setting said right angle adjustment piece's position along the horizontal, long axis of said base assembly.

9. An apparatus, for use in a process of producing prints in a color video printer by sublimating multiple dyes to make images on said prints and transferring said images from said prints by sublimating said dyes of which said images on said prints are composed by means of the apparatus to be transmitted to the surface of a drinking vessel having a surface receptive to sublimation dyes, the apparatus comprising:

A. a base assembly;

B. a first platen assembly mounted on an upper surface of said base assembly near an end of said base assembly;

C. a second platen assembly slidably mounted on the upper surface of said based assembly, said second platen assembly disposed opposite said first platen assembly in an arrangement so that the drinking vessel is received therebetween;

D. means for sliding said platen assemblies rectilinearly relative to each other so as to retain the drinking vessel with said print applied thereto under pressure exerted by about 200 to 400 pounds of force on said drinking vessel between said first and said second platen assemblies; and E. means for heating said first and second platen assemblies to a temperature in the range of about 320° F. to 480° F., said means for heating sufficiently heating said platen assemblies while said means for sliding retain said drinking vessel and said print under sufficient high pressure for a sufficient period of time while said print is being forced against said drinking vessel to effect a substantially faithful sublimation transfer of an image from said print to said drinking vessel; said first platen assembly being resiliently mounted on the upper surface of said base assembly; the apparatus further comprising at least two compression assemblies mounted respectively to the rear of each of said first and second platen assemblies, said compression assemblies attached to said first platen assembly being attached on an opposite end to a fixed receiving plate, said compression assemblies attached to said second platen assembly being slidably received in said means for sliding said second platen assembly.

10. An apparatus for transferring a multiple color video image onto an article's solid surface which is capable of receiving and retaining sublimable dyes which comprises:

(a) a video camera for producing a multiple color video image;

(b) a color video printer that transmits via sublimation of sublimable dyes said multiple color video image produced by said video camera onto color video printer print paper in the form of a multiple color image defined by said sublimable dyes received by said print paper; and (c) a thermal transfer press that receives the aforesaid print paper with said multiple color image thereon and transfers said multiple color image onto said article's solid surface, said print paper being positioned in said press so that its front surface which received said multiple color image is urged against said article's solid surface and said print paper's back surface is engaged by said press to provide complete pressurized contact between the area of said multiple color image on said front surface of said print paper and said article's solid surface where it is intended to receive said multiple color image, said press including means for sufficiently heating and applying pressure against said print paper which is sufficiently high to transfer said multiple color image solely via said sublimable dyes to said article's solid surface substantially completely and with substantially no distortion and attenuation of the multiple color image so transferred by sublimation of said sublimable dyes from said print paper so that they solidify on said article's solid surface, said image transfer being a substantially faithful reproduction of said multiple color video image.

11. Apparatus in accordance with claim 10 further comprising a video monitor for viewing the multiple color video image produced by said video camera and means for selecting the multiple color video image to be transmitted by said color printer to said print paper.

12. Apparatus in accordance with claim 10 wherein said thermal transfer press comprises a first and a second metal platens having surfaces which correspond respectively to two oppositely disposed surfaces of said article and which removably receive said article therebetween, and electrical heating elements capable of causing said first metal platen to be heated to a temperature which is in the range of 325° F. to 450° F.

13. Apparatus in accordance with claim 12 wherein said thermal transfer press includes a closing device for exerting high pressures via said platens on the article disposed between said platens.

14. Apparatus in accordance with claim 13 wherein said closing device includes mechanical means for moving said platens rectilinearly relative to each other so as to subject said article to substantially uniform pressures between said platens.

15. Apparatus in accordance with claim 14 wherein said thermal transfer press includes resilient means attached to the inner surfaces of said platens for ensuring said pressures are applied over said solid surface of said article in a generally uniform fashion.

16. Apparatus in accordance with claim 10 wherein said thermal transfer press comprises heating elements for heating said video print to a temperature of about 400° F. plus or minus 20%.

17. Apparatus in accordance with claim 10 wherein said thermal transfer press comprises means for urging said print paper against said article's surface with a total force in the range of about 200 to 400 lbs.

18. An apparatus as claimed in claim 10, wherein said color image comprises a photographic quality image.

19. A system for placing images on surfaces which accept and retain sublimable dyes comprising:

(a) means for creating a video multiple color image on a heat transfer printing sheet;

(b) means for the sublimation transferring of said video multiple color image from said printing sheet to a video print wherein said multiple color image therein is formed by said sublimable dyes;

(c) means for retaining said print with said multiple color image thereon in continuous contact with a said surface to which said multiple color image is to be transferred;

(d) means for applying force of at least about two hundred pounds to the back of said print to provide a continuous pressurized contact between said multiple color image on said print and said surface; and (e) means for applying heat at a temperature within the range of about 320° F. to 480° F. to said print while said multiple color image on said print is in said continuous pressurized contact with said surface for a sufficient period of time so that said multiple color image on said print is sublimation transferred via said sublimable dyes to said surface with substantially no distortion and attenuation of said transferred image.

20. A system as claimed in claim 19, wherein said multiple color video image comprises a photographic quality image.

21. An apparatus for transferring a multiple color image onto article's solid surface which is capable of receiving and retaining sublimable dyes which comprises:

(a) a multiple color image receiving device for converting a first multiple color image received thereby into electronic signals;

(b) a multiple color printer that receives said signals and converts said signals into a second multiple color image which it transfers by the sublimation of a plurality of different color sublimable dyes onto print paper in the form of a multiple color transfer image composed of sublimable dyes received by said print paper; and (c) a thermal transfer press that receives the aforesaid print paper with said multiple color transfer image thereon and further transfers said multiple color transfer image onto said article's solid surface, said print paper being positioned in said press so that its surface which received said multiple color transfer image is urged against said article's solid surface and said print paper's opposite surface is engaged by said press to provide pressurized contact between the area of said multiple color transfer image on said first mentioned surface of said print paper and said article's solid surface, said press including means for sufficiently heating and applying pressure against said print paper which is sufficiently high to transfer said multiple color transfer image via the sublimation of said sublimable dyes from said print paper onto said article's solid surface substantially completely and with substantially no distortion and attenuation of the multiple color transfer image so transferred by sublimation of said sublimable dyes from said print paper so that they solidify on said article's solid surface, the image so transferred to said article being a substantially faithful reproduction of said first multiple color image.

22. Apparatus in accordance with claim 21 wherein said multiple color image receiving device comprises a video camera, the apparatus further comprising a video monitor for viewing color video images produced by said video camera and means for selecting a said color video image to be transferred by said multiple color printer to said print paper.

23. Apparatus in accordance with claim 21 wherein said thermal transfer press applies a force against said print paper for transferring said multiple color transfer image onto said article's solid surface in the range of about 200 to 400 lbs. and sublimates said sublimable dyes in said print paper by heating them to a temperature which is in the range of about 320° F. to 480° F.

24. A device for placing wear and light resistant images on surfaces adapted to absorb a sublimable dye comprising:

means for creating a multi-color video image;

means for transferring said video image to produce a print wherein said image is formed by sublimating multi-color sublimable dyes onto said print;

means for retaining said print with said image thereon in continuous contact with said surfaces to be printed;

means for applying force to the back of said print to provide a continuous pressurized contact between said image on said print and said surface; and means for applying heat in the range of about 350° F. to 450° F. to said print while said image on said print is in continuous pressurized contact with said surface at sufficient pressure so that said image on said print is transferred via sublimation of said dyes to said surface.

25. A device as claimed in claim 24 further comprising means for creating a mirror image of said video image, said mirror image being printed to produce to said print.

26. A device in accordance with claim 25, wherein said surface comprises a solid surface.

27. A device in accordance with claim 26, wherein said surface comprises a coating which is adapted to absorb sublimable dyes on a ceramic surface.

28. A device in accordance with claim 27, wherein said surface comprises said coating on a tile.

29. A device in accordance with claim 27, wherein said surface comprises said coating on a mug.

30. A system for transferring colored images onto objects having surfaces composed of a material that accepts sublimable dyes, said system comprising a video camera, a video monitor, a color video dye sublimation printer interconnected to said video camera and said video monitor, and a thermal transfer press for transferring by means of dye sublimation at temperatures of about 350° F. to 450° F. prints produced by said color video dye sublimation printer having colored images thereon recorded by said video camera as captured on said video monitor to said objects.

31. A system in accordance with claim 30, comprising means for reversing said images which are received by said prints from said color video printer.

32. A system in accordance with claim 31, wherein said thermal transfer press comprises a pair of platens and electrical means for heating said platens to a temperature in the range of 350° F. to 450° F., said article comprising a coffee mug, said platens having opposed curved surfaces corresponding to the curved surfaces of said coffee mug.

* * * * *